United States Patent
Baum et al.

(10) Patent No.: US 12,550,900 B2
(45) Date of Patent: Feb. 17, 2026

(54) STABLE AQUEOUS IPBC DISPERSIONS

(71) Applicant: Thor GmbH, Speyer (DE)

(72) Inventors: Rüdiger Baum, Speyer (DE); Holger Bittermann, Schriesheim (DE)

(73) Assignee: Thor GmbH, Speyer (DE)

( * ) Notice: Subject to any disclaimer, the term of this patent is extended or adjusted under 35 U.S.C. 154(b) by 545 days.

(21) Appl. No.: 17/921,676

(22) PCT Filed: Apr. 14, 2021

(86) PCT No.: PCT/EP2021/000046
§ 371 (c)(1),
(2) Date: Oct. 27, 2022

(87) PCT Pub. No.: WO2021/219242
PCT Pub. Date: Nov. 4, 2021

(65) Prior Publication Data
US 2023/0157295 A1    May 25, 2023

(30) Foreign Application Priority Data

Apr. 28, 2020 (EP) ................................. 20000171

(51) Int. Cl.
*A01N 47/12* (2006.01)
*A01N 25/04* (2006.01)
*A01P 1/00* (2006.01)

(52) U.S. Cl.
CPC ............. *A01N 47/12* (2013.01); *A01N 25/04* (2013.01); *A01P 1/00* (2021.08)

(58) Field of Classification Search
CPC ............ A01N 47/12; A01N 25/04; A01P 1/00
See application file for complete search history.

(56) References Cited

U.S. PATENT DOCUMENTS

2011/0009268 A1    1/2011    Uhr et al.

FOREIGN PATENT DOCUMENTS

| DE | 102007024208 | * | 11/2008 |
| DE | 102007024208 A1 | | 11/2008 |
| WO | WO2011/071876 A1 | * | 6/2011 |
| WO | WO 2011150224 A1 | | 12/2011 |

OTHER PUBLICATIONS

English Translation of PCT International Search Report for PCT/EP2021/000046 dated Aug. 10, 2021.

* cited by examiner

*Primary Examiner* — Robert A Wax
*Assistant Examiner* — Kimberly Barber
(74) *Attorney, Agent, or Firm* — McCarter & English, LLP

(57) ABSTRACT

The invention relates to an aqueous dispersion comprising the following components: (a) 25 to 60 wt. % of 3-iodo-2-propynyl butyl carbamate (IPBC), (b) 0.05 to 5 wt. % of at least one compound selected from the group consisting of methyl cellulose, hydroxyethyl cellulose, hydrophobically modified hydroxyethyl cellulose, hydroxypropyl methyl cellulose, hydroxypropyl cellulose, hydroxyethyl methyl cellulose and carboxymethyl cellulose, or mixtures of two or more of these, (c) 1 to 10 wt. % of at least one block copolymer based on ethylene oxide and propylene oxide, having a numerically defined average molecular weight of between 1,000 g/mol and 15,000 g/mol, (d) 0.1 to 10 wt. % of at least one thickener and/or anti-settling agent, and (e) up to 100 wt. % of water, in each case based on the total aqueous dispersion. The invention further relates to the use of this dispersion for the protection of technical materials from attack and/or destruction by microorganisms.

12 Claims, No Drawings

STABLE AQUEOUS IPBC DISPERSIONS

CROSS-REFERENCE TO RELATED APPLICATIONS

This application is a 35 U.S.C. § 371 National Stage filing of International Application No. PCT/EP2021/000046, filed on Apr. 14, 2021, which claims priority to European Patent Application 20000171.7, filed on Apr. 28, 2020. The contents of the foregoing applications are incorporated herein by reference.

BACKGROUND

1. Technical Field

The invention relates to an aqueous dispersion comprising the following components: (a) 25 to 60 wt. % of 3-iodo-2-propynyl butyl carbamate (IPBC), (b) 0.05 to 5 wt. % of at least one compound selected from the group consisting of methyl cellulose, hydroxyethyl cellulose, hydroxypropyl methyl cellulose, hydrophobically modified hydroxyethyl cellulose, hydroxypropyl cellulose, hydroxyethyl methyl cellulose and carboxymethyl cellulose, or mixtures of two or more thereof, (c) 1 to 10 wt. % of at least one block copolymer based on ethylene and propylene oxide having a numerically defined average molecular weight of between 1,000 g/mol and 15,000 g/mol, (d) 0.1 to 10 wt. % of at least one thickener and/or anti-settling agent, and (e) up to 100 wt. % of water, in each case based on the total aqueous dispersion. The invention further relates to the use of this dispersion for the protection of technical materials from attack and/or destruction by microorganisms.

The invention further relates to the use of 0.05 to 5 wt. % of at least one compound selected from the group consisting of methyl cellulose, hydroxyethyl cellulose, hydrophobically modified hydroxyethyl cellulose, hydroxypropyl methyl cellulose, hydroxypropyl cellulose, hydroxyethyl methyl cellulose and carboxymethyl cellulose, or mixtures of two or more of these, for stabilizing an aqueous dispersion comprising: (i) from 25 to 60 wt. % of 3-iodo-2-propynyl butyl carbamate (IPBC), (ii) from 1 to 10 wt. % of at least one ethylene and propylene oxide based block copolymer having a numerically defined average molecular weight of between 1,000 g/mol and 15,000 g/mol, (iii) from 0.1 to 10 wt. % of at least one thickener and/or anti-settling agent, and (iv) up to 100 wt. % of water, in each case based on the total aqueous dispersion.

2. Background Art

Iodopropargyl compounds are antimicrobial agents. The most important compound in this class of substances is 3-iodo-2-propynyl-N-n-butyl carbamate (hereinafter also referred to as IPBC). IPBC is commercially available, either in solid form, as well as also in various liquid concentrates, most of which contain organic solvents. However, the need for formulations with no or low VOC (volatile organic compounds) has increased significantly in recent years. For this purpose, aqueous dispersions of IPBC have been developed.

However, aqueous IPBC suspensions available on the market to date mostly exhibit unsatisfactory stability during storage, since crystallization can lead to an increase in the viscosity of the dispersions, which has a negative effect on their applicability. The cause for this is the low water solubility of IPBC's, which in aqueous compositions leads to large particles growing at the expense of small particles. During storage, in particular at higher temperatures, this leads to the formation of large crystals, associated with sometimes massive sedimentation, or increase in viscosity.

Attempts have already been made to solve this problem. For this purpose, for example, in PCT disclosure WO 00/57702 A1, aqueous dispersions containing iodopropargyl compounds and partially hydrolyzed polyvinyl alcohol have been described and are intended to reduce crystal growth in formulations. The dispersions described still, however, show an increase in viscosity and thereby reduced flowability when stored at higher temperatures.

Furthermore, the German disclosure DE 10 2007 024 208 A1 proposes the use of block and/or block copolymers based on ethylene and/or propylene oxide, with a numerically determined average molecular weight greater than 1,000 g/mol, to obtain allegedly stable IPBC-containing dispersions. Nonetheless, even these dispersions show an increase in viscosity and thereby reduced flowability when stored at higher temperatures.

Even though known prior art approaches have already resulted in more stable aqueous dispersions of IPBC, there is still a need for aqueous IPBC dispersions that are stable during storage and have relatively high concentrations.

Starting from the prior art, the invention was thus based on the task of providing alternative, stable aqueous IPBC dispersions.

SUMMARY

It was surprisingly found that the aqueous dispersion defined hereinafter solves the above task. The present invention therefore relates to an aqueous dispersion containing the components:

(a) 25 to 60 wt. %, preferably 35 to 60 wt. %, particularly preferably 38 to 52 wt. % of 3-iodo-2-propynyl butyl carbamate, (b) 0.05 to 5 wt. %, preferably 0.05 to 2 wt. % of at least one compound selected from the group consisting of methyl cellulose, hydroxyethyl cellulose, hydrophobically modified hydroxyethyl cellulose, hydroxypropyl methyl cellulose, hydroxypropyl cellulose, hydroxyethyl methyl cellulose and carboxymethyl cellulose, or mixtures of two or more of these, (c) 1.0 to 10 wt. %, preferably 1.0 to 5.0 wt. %, particularly preferably 1.0 to 3.0 wt. %, of at least one block copolymer based on ethylene oxide and propylene oxide, having a numerically defined average molecular weight of between 1,000 g/mol and 15,000 g/mol, preferably between 2,000 g/mol and 10,000 g/mol, particularly preferably between 2,900 g/mol and 7,000 g/mol, (d) 0.1 to 10 wt. % of at least one thickener and/or anti-settling agent, and (e) up to 100 wt. % of water, in each case based on the total aqueous dispersion.

DETAILED DESCRIPTION

Surprisingly, new aqueous IPBC dispersions have now been found within the scope of the present invention which advantageously overcome the disadvantages of the prior art. The dispersions according to the invention are characterized in particular by a more stable or virtually constant viscosity during prolonged storage.

As component (a), the aqueous dispersion according to the invention contains 25 to 60 wt. %, preferably 35 to 60 wt.

%, particularly preferably 38 to 52 wt. %, of 3-iodo-2-propynyl butyl carbamate, hereinafter also referred to as IPBC, in each case based on the total aqueous dispersion.

According to a preferred embodiment of the invention, the composition according to the invention contains component (a), the IPBC in the form of particles with an average particle size in the range between 5 and 30 μm.

As component (b), the aqueous dispersion according to the invention contains 0.05 to 5 wt. %, preferably 0.05 to 2 wt. %, of at least one compound selected from the group consisting of methyl cellulose, hydroxyethyl cellulose, hydrophobically modified hydroxyethyl cellulose, hydroxypropyl methyl cellulose, hydroxypropyl cellulose, hydroxyethyl methyl cellulose and carboxymethyl cellulose, or mixtures of two or more of these, in each case based on the total aqueous dispersion. According to a particularly preferred embodiment of the invention, the dispersion contains, as component (b), 0.05 to 5 wt. %, preferably 0.05 to 2 wt. %, of methyl cellulose and/or hydroxypropyl methyl cellulose.

As component (c), the aqueous dispersion according to the invention contains 1.0 to 10 wt. %, preferably 1.0 to 5.0 wt. %, particularly preferably 1.5 to 4 wt. %, of at least one block copolymer (hereinafter also referred to as surfactant) based on ethylene oxide and propylene oxide, in each case based on the total aqueous dispersion. The numerically determined average molecular weight is generally of between 1,000 g/mol and 15,000 g/mol, preferably of between 2,000 g/mol and 10,000 g/mol and particularly preferably of between 2,900 g/mol and 7,000 g/mol. The block copolymers of component (c) are composed of ethylene oxide and propylene oxide units, wherein the number of the respective units may be able to vary over a wide range. The content of polyethylene glycol in the molecule is generally in the range between 35 and 55 wt. %, preferably in the range between 40 and 50 wt. %, based on the molecular weight of the polymer.

According to a preferred embodiment of the invention, the dispersion according to the invention contains as component (c) at least one block copolymer (hereinafter also referred to as surfactant) based on ethylene oxide and propylene oxide according to the formula shown below:

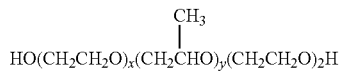

wherein x, y and z represent numbers chosen in such a way that the numerically determined average molecular weight is in total above 1,000 g/mol, wherein the content of polyethylene glycol in the molecule is in the range between 35 and 55 wt. %, preferably in the range between 40 and 50 wt. %, based on the molecular weight. The polymers of component (c) are generally mixtures of several compounds of the formula reproduced above, which differ in the values of x, y and z. In this manner, fractional numbers can also be calculated as average values for these indices. These compounds are generally prepared by deposition of ethylene oxide on polypropylene glycol. Examples of preferred components (c) are PLURONIC™ PE 6400, PLURONIC™ PE 9400 and PLURONIC™ PE 10500 from BASF SE.

According to a particularly preferred embodiment of the invention, the numerically determined average molecular weight of component (c) is in the range between 2,900 g/mol and 7,000 g/mol, wherein the content of polyethylene glycol in the molecule is in the range between 35 and 55 wt. %, preferably in the range between 39 and 51 wt. %, in each case based on the molecular weight.

As component (d), the aqueous dispersion according to the invention contains 0.1 to 10 wt. %, preferably 0.1 to 5 wt. %, particularly preferably 0.2 to 3 wt. %, of at least one thickening agent and/or anti-settling agent, in each case based on the total aqueous dispersion.

In principle, it is possible to use as thickening agent or alternatively anti-settling agent, component (d), all substances known to the person skilled in the art and normally used for the production of dispersions which build up a spatial structure in the water and can thus prevent or slow down the sedimentation of the dispersion. Preferably, thickening substances selected from the group consisting of xanthan gum, carrageenan, guar gum, locust bean gum, gum arabic, alginates, bentonite, phyllosilicates, sodium or magnesium silicates, heteropolysaccharides and/or polyacrylic acids are used as component (d). Very preferably, xanthan gum, bentonite and/or phyllosilicates are used.

According to a preferred embodiment of the invention, the dispersion according to the invention contains as thickener, component (d), 0.1 to 0.5 wt. % of xanthan gum.

In addition to components (a), (b), (c) and (d), the aqueous dispersion according to the invention contains, as component (e), up to 100% water, based on the total aqueous dispersion. This means that water is present in addition to components (a), (b), (c) and (d) and optionally other components, such as defoamers, preservatives and dispersants. In general, the dispersion according to the invention contains about 15 to 74 wt. %, preferably about 23 to 64 wt. %, of water, in each case based on the total weight of the dispersion.

According to one embodiment, the aqueous dispersion according to the invention contains at least one defoamer as further component(s). In principle, all substances known to the person skilled in the art and normally used for the production of dispersions, which are used for defoaming aqueous media, for example silicone defoamers (Aspumit™ AP), can be used as defoamers. The proportion of defoamer, the component in the dispersion according to the invention, is preferably 0.02 to 0.4 wt. %, in particular 0.05 to 0.2 wt. %, based on the total weight of the dispersion.

The aqueous dispersion according to the invention has a viscosity in the range between 1,000 and 4,000 mPas, preferably in the range between 1,400 and 2,400 mPas, measured with a Brookfield Viscometer (3/30 spindle at 20° C.).

According to a preferred embodiment, the aqueous dispersion according to the invention is characterized by having a pH in the range between pH 5 and pH 11, preferably in the range between pH 5 and pH 9.

Preferred dispersions according to the invention are further characterized in that they have a volatile organic content (VOC) of less than 5 wt. %, in particular less than 1 wt. %. In this context, VOC means compounds with a boiling point of <250° C. at normal pressure.

A dispersion containing exclusively components (a), (b), (c), (d) and (e) in the stated weight ratios, without the presence of any further component, is referred to in the context of the present invention as an "aqueous dispersion according to the invention". In addition to components (a), (b), (c), (d) and (e) in the stated weight ratios, the "aqueous dispersion according to the invention" may comprise one or more further components. The further component or components may have a microbicidal effect, or they may have no microbicidal effect, for example, they may be a solvent, dispersant or suspending agent.

In a further embodiment, the "aqueous dispersion according to the invention" comprises components (a), (b), (c), (d) and (e) in the mixing ratios indicated above (which is to say, the aqueous dispersion according to the invention). This means that the dispersion according to the invention contains only components (a), (b), (c), (d) and (e).

In a further embodiment of the invention, the aqueous dispersion according to the invention consists "essentially" of the components (a), (b), (c), (d) and (e) according to the invention, which is to say, in addition to these components, one or also several other components may well be present in a small amount, but these are present in such an amount that they do not contribute to the properties of the aqueous dispersion according to the invention.

The invention further comprises a method for preparing the aqueous dispersion according to the invention, in which the individual components are mixed together with stirring at a temperature of 20 to 60° C.

In principle, all fungicides and/or bactericides known to those skilled in the art which have an antimicrobial effect in the desired sense can be used as additional antimicrobially active compounds which may be present. In this connection, one or more of these substances may optionally be used. The fungicides and bactericides optionally contained are preferably one or more compound(s) selected from the group consisting of 2-methyl-4-isothiazolin-3-one, 5-chloro-2-methyl-4-isothiazolin-3-one, 1,2-benzothiazol-3-one, 2-bromo-2-nitropropane-1,3-diol and 2,2-dibromo-3-nitrilopropionamide.

The proportion of the additionally contained antimicrobially active compound(s) in the dispersion according to the invention is 0.0005 to 2 wt. %, preferably 0.001 to 1 wt. %, in particular 0.005 to 0.5 wt. %, based on the dispersion.

According to a preferred embodiment of the invention, the dispersion according to the invention contains the following components, or alternatively consists of the following components:

(a) 38 to 42 wt. % of 3-iodo-2-propynyl butyl carbamate,
(b) 0.05 to 1.0 wt. % of hydroxypropyl methyl cellulose and/or methyl cellulose,
(c) 1.0 to 2.5 wt. % of at least one block copolymer or surfactant according to the following formula

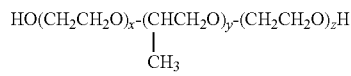

wherein x, y and z represent numbers selected such that the total molecular weight is preferably in the range between 2,900 g/mol and 7,000 g/mol, and the content of polyethylene glycol in the molecule is in the range between 35 and 55 wt. %, preferably in the range between 40 and 50 wt. %, based on the molecular weight,
(d) 0.1 to 0.5 wt. % of at least one thickener selected from the group consisting of xanthan gum, bentonite and phyllosilicates, and
(e) up to 100 wt. % of water, in each case based on the total aqueous dispersion.

According to a further preferred embodiment of the invention, the dispersion according to the invention contains the following components, or alternatively consists of the following components:
(a) 48 to 52 wt. % of 3-iodo-2-propynyl butyl carbamate,
(b) 0.05 to 1.0 wt. % of hydroxypropyl methyl cellulose and/or methyl cellulose,
(c) 1.0 to 3.0 wt. % of at least one block copolymer or surfactant according to the following formula

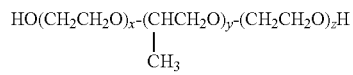

wherein x, y and z represent numbers selected such that the total molecular weight is in the range between 2,900 g/mol and 7,000 g/mol preferably, and the content of polyethylene glycol in the molecule is in the range between 35 and 55 wt. %, preferably in the range between 40 and 50 wt. %, based on the molecular weight,
(d) 0.1 to 0.5 wt. % of at least one thickener selected from the group consisting of xanthan gum, bentonite and phyllosilicates, and
(e) up to 100 wt. % of water, in each case based on the total aqueous dispersion.

According to a further preferred embodiment of the invention, the dispersion according to the invention contains the following components, or alternatively consists of the following components:
38.0 to 42.0 wt. %, preferably 40.0 wt. % of IPBC
0.08 to 0.2 wt. %, preferably 0.12 wt. % of methyl cellulose
0.1 to 0.5 wt. %, preferably 0.34 wt. % of xanthan thickener
1.5 to 2.5 wt. %, preferably 1.8 wt. % of Pluronic™ PE 10500 BASF SE
0.05 to 0.2 wt. %, preferably 0.1 wt. % of silicone defoamer
Up to 100 wt. % of water, in each case based on the total aqueous dispersion.

According to a further preferred embodiment of the invention, the dispersion according to the invention contains the following components, or alternatively consists of the following components:
48.0 to 52.0 wt. %, preferably 40.0 wt. % of IPBC
0.08 to 0.25 wt. %, preferably 0.12 wt. % of methyl cellulose
0.1 to 0.5 wt. %, preferably 0.30 wt. % of xanthan thickener
1.5 to 2.8 wt. %, preferably 2.25 wt. % of Pluronic™ PE 10500 BASF SE
0.05 to 0.2 wt. %, preferably 0.1 wt. % of silicone defoamer
Up to 100 wt. % of water, in each case based on the total aqueous dispersion.

The invention further relates to the use of the dispersion according to the invention as a preservative for the protection of technical materials from attack and/or destruction by microorganisms. Materials such as, in particular, adhesives, sealants, glues, paper, cardboard, leather, wood, wood-based materials, wood coatings, wood-plastic composites, paints, coatings and plasters come into consideration as technical materials. Very particularly preferred are wood coatings, paints, coatings, plasters.

The invention also relates to a method for the protection of technical materials from attack and/or destruction by microorganisms, characterized in that the dispersion according to the invention is allowed to act on the microorganism or its habitat. The application quantity of the dispersion according to the invention depends on the type and occurrence of the microorganisms to be controlled and on the composition of the material to be protected. The optimum application amount can be determined by series of tests. Generally, 0.001 to 5 wt. % of the dispersion according to the invention is used, preferably from 0.02 to 2.0 wt. %, based on the material to be protected.

The present invention further relates to the use of between 0.05 and 5 wt. %, preferably between 0.05 and 2 wt. %, of at least one compound selected from the group consisting of methyl cellulose, hydroxyethyl cellulose, hydrophobically modified hydroxyethyl cellulose, hydroxypropyl methyl cellulose, hydroxypropyl cellulose, hydroxyethyl methyl cellulose, and carboxymethyl cellulose, or mixtures of two or more thereof, for stabilizing the settling behavior of an aqueous dispersion comprising:

(i) 25 to 60 wt. %, preferably 35 to 60 wt. %, more preferably 38 to 52 wt. % of 3-iodo-2-propynyl butyl carbamate (IPBC), (ii) 1 to 10 wt. %, preferably 1 to 5 wt. %, particularly preferably 1 to 3 wt. %, of at least one block copolymer based on ethylene oxide and propylene oxide, having a numerically determined average molecular weight between 1,000 g/mol and 15,000 g/mol, preferably of between 2,000 g/mol and 10,000 g/mol, particularly preferably of between 2,900 g/mol and 7,000 g/mol, wherein the content of polyethylene glycol in the molecule is in the range between 35 and 55 wt. %, preferably in the range between 39 and 51 wt. %, in each case based on the molecular weight, (iii) 0.1 to 10 wt. % of at least one thickener and/or anti-settling agent, and (iv) up to 100 wt. % of water, in each case based on the total aqueous dispersion.

In the context of the present invention, it was found that by using the selected cellulose ethers, it was possible to obtain concentrated aqueous dispersions of IPBC which exhibit improved settling behavior during prolonged storage compared to dispersions known in the prior art. The dispersions according to the invention are characterized in particular by a stable or alternatively constant viscosity during prolonged storage.

The following examples and comparative examples are provided to further illustrate the present invention.

General specification for the preparation of the dispersions mentioned in comparative examples 1 to 4 and in examples 1 to 12:

The cellulose ether is dissolved in a portion of the required water by a method known to the skilled person (for example, by sprinkling and allowing to swell or by means of the so-called hot-cold method). Under agitation, the emulsifiers and the defoamer are dissolved or dispersed in this solution. The IPBC is subsequently dispersed in this liquid under agitation. The resulting dispersion is ground with a ball mill until the IPBC particles have reached the desired size. Finally, the thickener, which is present in an aqueous concentrated stock solution, is added and stirred in, and, optionally, topped up with water to the desired mass.

COMPARISON EXAMPLES 1 TO 4 AND EXAMPLES 1 TO 12

Comparison Example 1: 40% IPBC Dispersion 40.0 wt. % of IPBC (Hamlung Technology Co., Ltd.)
0.34 wt. % of xanthan thickener (Xanthan TGRD, Jungbunzlauer GmbH)
1.8 wt. % of non-ionic surfactant (Pluronic™ PE 10500 BASF SE)
0.1 wt. % of silicone defoamer (Aspumit™ AP, Thor GmbH)
Up to 100% water
Already after one week of storage at 40° C., the dispersion obtained showed an unacceptable increase in viscosity until it becomes firm.

Comparative Example 2: 40% IPBC Dispersion 40.0 wt. % of IPBC (THOR GmbH)
0.34 wt. % of xanthan thickener (Xanthan TGRD, Jungbunzlauer GmbH)
1.8 wt. % of non-ionic surfactant (Pluronic™ PE 10500 BASF SE)
0.1 wt. % of silicone defoamer (Aspumit™ AP, Thor GmbH)
Up to 100% water
The dispersion obtained showed a sharp increase in viscosity after only one week of storage at 40° C. After four weeks of storage, the viscosity had increased until becoming firm.

Comparative Example 3: 40% IPBC Dispersion 40.0 wt. % of IPBC (Hamlung Technology Co., Ltd.)
0.34 wt. % of xanthan thickener (Xanthan TGRD, Jungbunzlauer GmbH)
1.8 wt. % of non-ionic surfactant (Pluronic™ PE 10500 BASF SE).
0.4 wt. % of non-ionic surfactant (Lutensol™ TO 6, BASF SE)
0.1 wt. % of silicone defoamer (Aspumit™ AP, Thor GmbH)
Up to 100% water
Already after one week of storage at 40° C., the dispersion obtained showed an unacceptable increase in viscosity until it becomes firm.

Comparative Example 4: 50% IPBC Dispersion 50.0 wt. % of IPBC (Hamlung Technology Co., Ltd.)
0.33 wt. % of xanthan thickener (Xanthan TGRD, Jungbunzlauer GmbH)
2.25 wt. % of non-ionic surfactant (Pluronic™ PE 10500 BASF SE)
0.1 wt. % of silicone defoamer (Aspumit™ AP, Thor GmbH)
Up to 100% water
Already after one week of storage at 40° C., the dispersion obtained showed an unacceptable increase in viscosity until it becomes firm.

Example 1: 40% IPBC Dispersion Stabilized with Hydroxypropyl Methyl Cellulose 40.0 wt. % of IPBC (Hamlung Technology Co., Ltd.)
0.50 wt. % of hydroxypropyl methyl cellulose (Benecel™ E5, Ashland)
0.34 wt. % of xanthan thickener (Xanthan TGRD, Jungbunzlauer GmbH)
1.8 wt. % of non-ionic surfactant (Pluronic™ PE 10500 BASF SE)
0.1 wt. % of silicone defoamer (Aspumit™ AP, Thor GmbH)
Up to 100% water

The obtained dispersion is free flowing after storage at 40° C. for one and four weeks.

Example 2: 50% IPBC Dispersion Stabilized with
Hydroxypropyl Methyl Cellulose 50.0 wt. % of IPBC (THOR GmbH)
0.30 wt. % of hydroxypropyl methyl cellulose (Benecel™ E5, Ashland)
0.30 wt. % of xanthan thickener (Xanthan TGRD, Jungbunzlauer GmbH)
2.25 wt. % of non-ionic surfactant (Pluronic™ PE 10500 BASF SE)
0.1 wt. % of silicone defoamer (Aspumit™ AP, Thor GmbH)
Up to 100% water The dispersion obtained is free flowing after storage at 40° C. for one and four weeks.

Example 3: 40% IPBC Dispersion Stabilized with
Methyl Cellulose 40.0 wt. % of IPBC (THOR GmbH)
0.12 wt. % of methyl cellulose (Methocel™ A4C, DuPont)
0.32 wt. % of xanthan thickener (Xanthan TGRD, Jungbunzlauer GmbH)
1.8 wt. % of non-ionic surfactant (Pluronic™ PE 10500 BASF SE)
0.1 wt. % of silicone defoamer (Aspumit™ AP, Thor GmbH)
Up to 100 wt. % of water The dispersion obtained is free flowing after storage at 40° C. for one and four weeks.

Example 4: 40% IPBC Dispersion Stabilized with
Methyl Cellulose 40.0 wt. % of IPBC (Hamlung Technology Co., Ltd.)
0.12 wt. % of methyl cellulose (Methocel™ A4C, DuPont)
0.32 wt. % of xanthan thickener (Xanthan TGRD, Jungbunzlauer GmbH)
1.8 wt. % of non-ionic surfactant (Pluronic™ PE 6400 BASF SE)
0.1 wt. % of non-ionic surfactant (Aspumit™ AP, Thor GmbH)
Up to 100 wt. % of water The dispersion obtained is free flowing after storage at 40° C. for one and four weeks.

Example 5: 50% IPBC Dispersion Stabilized with
Methyl Cellulose 50.0 wt. % of IPBC (Hamlung Technology Co., Ltd.)
0.12 wt. % of methyl cellulose (Methocel™ A4C, DuPont)
0.30 wt. % of xanthan thickener (Xanthan TGRD, Jungbunzlauer GmbH)
2.25 wt. % of non-ionic surfactant (Pluronic™ PE 10500 BASF SE)
0.1 wt. % of silicone defoamer (Aspumit™ AP, Thor GmbH)
Up to 100 wt. % of water The dispersion obtained is free flowing after storage at 40° C. for one and four weeks.

Example 6: 40% IPBC Dispersion Stabilized with
Low-Viscosity Methyl Cellulose 40.0 wt. % of IPBC (Hamlung Technology Co., Ltd.)
0.2 wt. % of methyl cellulose (Methocel™ A15 LV, DuPont)
0.34 wt. % of xanthan thickener (Xanthan TGRD, Jungbunzlauer GmbH)
1.8 wt. % of non-ionic surfactant (Pluronic™ PE 10500 BASF SE)
0.4 wt. % of non-ionic surfactant (Lutensol™ TO 6, BASF SE)
0.1 wt. % of silicone defoamer (Aspumit™ AP, Thor GmbH)
Up to 100 wt. % of water The dispersion obtained is free flowing after storage at 40° C. for one and four weeks.

Example 7: 40% IPBC Dispersion Stabilized with
Hydroxyethyl Cellulose 40.0 wt. % of IPBC (Hamlung Technology Co., Ltd.)
0.5 wt. % of hydroxyethyl cellulose (Tylose™ H 10 YG4, SE Tylose GmbH & Co. KG)
0.34 wt. % of xanthan thickener (Xanthan TGRD, Jungbunzlauer GmbH)
1.8 wt. % of non-ionic surfactant (Pluronic™ PE 10500 BASF SE)
0.1 wt. % of silicone defoamer (Aspumit™ AP, Thor GmbH)
Up to 100 wt. % of water The dispersion obtained is still free-flowing after storage at 40° C. for one week and is highly thickened after storage at 40° C. for four weeks.

Example 8: 40% IPBC Dispersion Stabilized with
Methyl Hydroxyethyl Cellulose 40.0 wt. % of IPBC (Hamlung Technology Co., Ltd.)
0.5 wt. % of methyl hydroxyethyl cellulose (Tylose™ MH 2,000 YP2, SE Tylose GmbH & Co. KG)
0.24 wt. % of xanthan thickener (Xanthan TGRD, Jungbunzlauer GmbH)
1.8 wt. % of non-ionic surfactant (Pluronic™ PE 10500 BASF SE)
0.1 wt. % of silicone defoamer (Aspumit™ AP, Thor GmbH)
Up to 100 wt. % of water The dispersion obtained is free flowing after storage at 40° C. for one and four weeks.

Example 9: 50% IPBC Dispersion Stabilized with
Methyl Hydroxyethyl Cellulose 50.0 wt. % of IPBC (Hamlung Technology Co., Ltd.)
0.3 wt. % of methyl hydroxyethyl cellulose (Tylose™ MH 2,000 YP2, SE Tylose GmbH & Co. KG)
0.20 wt. % of xanthan thickener (Xanthan TGRD, Jungbunzlauer GmbH)
2.25 wt. % of non-ionic surfactant (Pluronic™ PE 10500 BASF SE)
0.1 wt. % of Silicone defoamer (Aspumit™ AP, Thor GmbH)
Up to 100 wt. % of water The dispersion obtained is free flowing after storage at 40° C. for one and four weeks.

Example 10: 40% IPBC Dispersion Stabilized with Hydroxypropyl Cellulose 40.0 wt. % of IPBC (Hamlung Technology Co., Ltd.)
1 wt. % of hydroxypropyl cellulose (Klucel™ E IND, Ashland)
0.34 wt. % of xanthan thickener (Xanthan TGRD, Jungbunzlauer GmbH)
1.8 wt. % of non-ionic surfactant (Pluronic™ PE 10500 BASF SE)
0.4 wt. % of non-ionic surfactant (Lutensol™ TO 6, BASF SE)
0.1 wt. % of silicone defoamer (Aspumit™ AP, Thor GmbH)
Up to 100 wt. % of water
The dispersion obtained is free flowing after storage at 40° C. for one and four weeks.

Example 11: 40% IPBC Dispersion Stabilized with Carboxymethyl Cellulose 40.0 wt. % of IPBC (Hamlung Technology Co., Ltd.)
0.5 wt. % of carboxymethyl cellulose (Blanose™ Ref CMC 7ULC, Ashland)
0.34 wt. % of xanthan thickener (Xanthan TGRD, Jungbunzlauer GmbH)
1.8 wt. % of non-ionic surfactant (Pluronic™ PE 10500 BASF SE)
0.4 wt. % of non-ionic surfactant (Lutensol™ TO 6, BASF SE)
0.1 wt. % of silicone defoamer (Aspumit™ AP, Thor GmbH)
Up to 100 wt. % of water
The dispersion obtained is still free-flowing after storage at 40° C. for one week and is highly thickened after storage at 40° C. for four weeks.

Example 12: 40% IPBC Dispersion Stabilized with Hydrophobically Modified Hydroxyethyl Cellulose 40.0 wt. % of IPBC (Hamlung Technology Co., Ltd.)
0.5 wt. % of hydrophobically modified hydroxyethyl cellulose (Natrosol™ Plus 330 PA, Ashland)
0.24 wt. % of xanthan thickener (Xanthan TGRD, Jungbunzlauer GmbH)
1.8 wt. % of non-ionic surfactant (Pluronic™ PE 10500 BASF SE)
0.4 wt. % of non-ionic surfactant (Lutensol™ TO 6, BASF SE)
0.1 wt. % of silicone defoamer (Aspumit™ AP, Thor GmbH)
Up to 100 wt. % of water
The dispersion obtained is still free-flowing after storage at 40° C. for one week and is highly thickened after storage at 40° C. for four weeks.

The invention claimed is:

1. An aqueous dispersion containing the components:
   (a) 25 to 60 wt. % of 3-iodo-2-propynyl butyl carbamate (IPBC),
   (b) 0.05 to 5 wt. % of at least one compound selected from the group consisting of methyl cellulose, hydroxyethyl cellulose, hydrophobically modified hydroxyethyl cellulose, hydroxypropyl methyl cellulose, hydroxypropyl cellulose, hydroxyethyl methyl cellulose, and carboxymethyl cellulose, or mixtures of two or more thereof,
   (c) 1 to 10 wt. % of at least one block copolymer based on ethylene oxide and propylene oxide, having a numerically defined average molecular weight of between 1,000 g/mol and 15,000 g/mol,
   (d) 0.1 to 10 wt. % of at least one thickener and/or anti-settling agent, and
   (e) up to 100 wt. % of water, in each case based on the total aqueous dispersion.

2. The dispersion according to claim 1, characterized in that the cellulose ether is selected from the group consisting of methyl cellulose, hydroxypropyl methyl cellulose and hydroxyethyl methyl cellulose.

3. The dispersion according to claim 1, characterized in that the dispersion contains the 3-iodo-2-propynyl butyl carbamate in the form of particles having an average particle size in the range between 5 and 30 μm.

4. The dispersion according to claim 1, characterized in that it comprises as component (c), at least one compound of the formula shown below

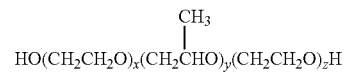

wherein x, y and z represent numbers selected such that the total molecular weight is above 1,000 g/mol and the content of polyethylene glycol in the molecule is in the range between 35 and 55 wt. % based on the molecular weight.

5. The dispersion according to claim 1, characterized in that it contains as component (c), a block copolymer based on ethylene oxide and propylene oxide, having a numerically determined average molecular weight between 2,900 g/mol and 7,000 g/mol, wherein the content of polyethylene glycol in the molecule is in the range between 35 and 55 wt. %, based on the molecular weight.

6. The dispersion according to claim 1, characterized in that it contains, as thickener, component (d), 0.1 to 0.5 wt. % of xanthan gum.

7. The dispersion according to claim 1, characterized in that the dispersion comprises the following components:
   (a) 38 to 42 wt. % of 3-iodo-2-propynyl butyl carbamate,
   (b) 0.05 to 1.0 wt. % of hydroxypropyl methyl cellulose and/or methyl cellulose,
   (c) 1.5 to 2.5 wt. % of at least one block copolymer according to the following formula

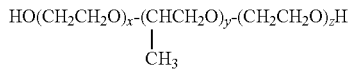

wherein x, y and z represent numbers selected such that the total molecular weight is in the range between 2,900 g/mol and 7,000 g/mol,
   (d) 0.1 to 0.5 wt. % of at least one thickener selected from the group consisting of xanthan gum, bentonite and phyllosilicates, and
   (e) up to 100 wt. % of water, in each case based on the total aqueous dispersion.

8. The dispersion according to claim 1, characterized in that the dispersion comprises the following components:
   (a) 48 to 52 wt. % of 3-iodo-2-propynyl butyl carbamate,
   (b) 0.05 to 1.0 wt. % of hydroxypropyl methyl cellulose and/or methyl cellulose, (c) 1.5 to 3.0 wt. % of at least one block copolymer according to the following formula

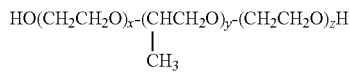

wherein x, y and z represent numbers chosen so that the total molecular weight is in the range between 2,900 g/mol and 7,000 g/mol, (d) 0.1 to 0.5 wt. % of at least one thickener selected from the group consisting of xanthan gum, bentonite and phyllosilicates, and (e) up to 100 wt. % of water, in each case based on the total aqueous dispersion.

9. A method for the protection of technical materials from attack and/or destruction by microorganisms, comprising applying to the technical materials, an aqueous dispersion containing the components:
(a) 25 to 60 wt. % of 3-iodo-2-propynyl butyl carbamate (IPBC),
(b) 0.05 to 5 wt. % of at least one compound selected from the group consisting of methyl cellulose, hydroxyethyl cellulose, hydrophobically modified hydroxyethyl cellulose, hydroxypropyl methyl cellulose, hydroxypropyl cellulose, hydroxyethyl methyl cellulose, and carboxymethyl cellulose, or mixtures of two or more thereof,
(c) 1 to 10 wt. % of at least one block copolymer based on ethylene oxide and propylene oxide, having a numerically defined average molecular weight of between 1,000 g/mol and 15,000 g/mol,
(d) 0.1 to 10 wt. % of at least one thickener and/or anti-settling agent, and
(e) up to 100 wt. % of water, in each case based on the total aqueous dispersion, wherein the aqueous dispersion act as a preservative.

10. The method according to claim 9, characterized in that the technical materials are adhesives, sealants, glues, paper, cardboard, leather, wood, wood-based materials, wood coatings, wood-plastic composites, paints, coatings and plasters.

11. A method for the protection of technical materials from attack and/or destruction by microorganisms, comprising applying to the microorganism or its habitat, an aqueous dispersion containing the components:
(a) 25 to 60 wt. % of 3-iodo-2-propynyl butyl carbamate (IPBC),
(b) 0.05 to 5 wt. % of at least one compound selected from the group consisting of methyl cellulose, hydroxyethyl cellulose, hydrophobically modified hydroxyethyl cellulose, hydroxypropyl methyl cellulose, hydroxypropyl cellulose, hydroxyethyl methyl cellulose, and carboxymethyl cellulose, or mixtures of two or more thereof,
(c) 1 to 10 wt. % of at least one block copolymer based on ethylene oxide and propylene oxide, having a numerically defined average molecular weight of between 1,000 g/mol and 15,000 g/mol,
(d) 0.1 to 10 wt. % of at least one thickener and/or anti-settling agent, and
(e) up to 100 wt. % of water, in each case based on the total aqueous dispersion.

12. A method for the stabilization of an aqueous dispersion comprising:
(i) 25 to 60 wt. % of 3-iodo-2-propynyl butyl carbamate (IPBC),
(ii) 1 to 10 wt. % of at least one block copolymer based on ethylene oxide and propylene oxide, having a numerically defined average molecular weight of between 1,000 g/mol and 15,000 g/mol,
(iii) 0.1 to 10 wt. % of at least one thickener and/or anti-settling agent, and
(iv) up to 100 wt. % of water, in each case based on the total aqueous dispersion;
wherein the aqueous dispersion further comprises 0.05 to 5 wt. % of at least one compound selected from the group consisting of methyl cellulose, hydroxyethyl cellulose, hydrophobically modified hydroxyethyl cellulose, hydroxypropyl methyl cellulose, hydroxypropyl cellulose, hydroxyethyl methyl cellulose, and carboxymethyl cellulose, or mixtures of two or more thereof.

* * * * *